(No Model.)
J. GLOECKNER.
DINNER PAIL.
No. 368,469. Patented Aug. 16, 1887.
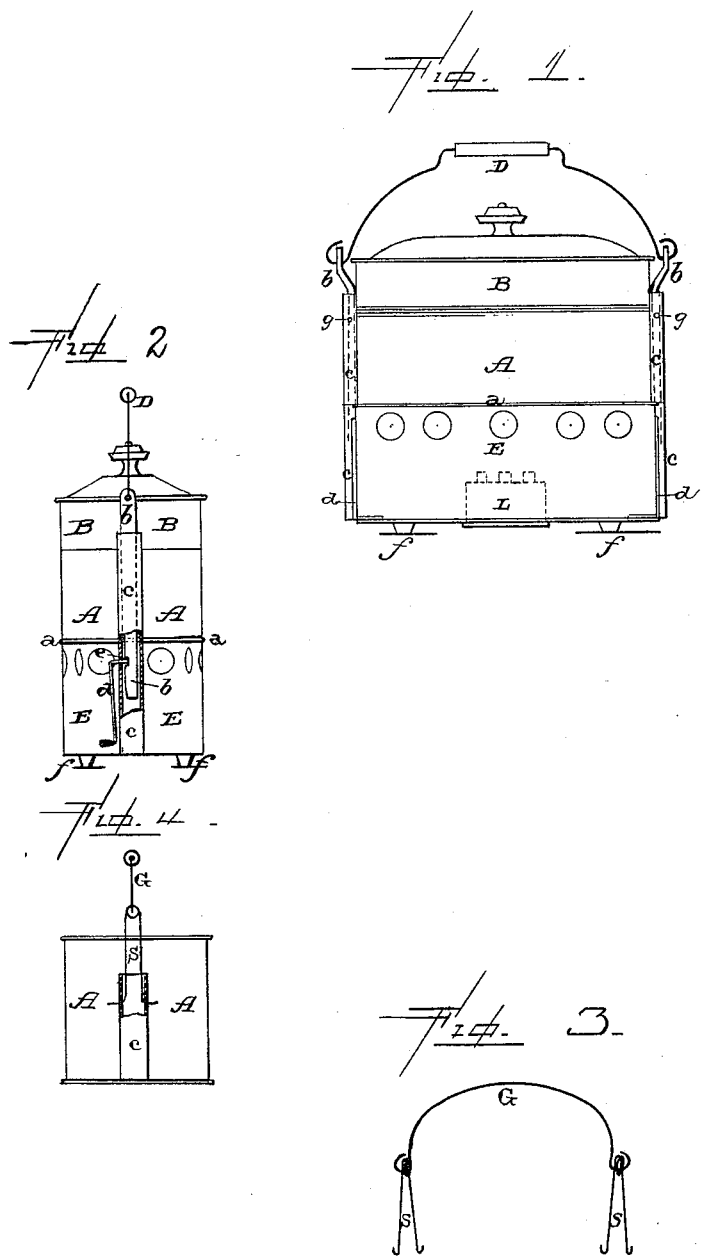
Witnesses.
L. L. Gardner
A. S. Pattison
Inventor.
Jno. Gloeckner,
per F. A. Lehmann,
Atty.

United States Patent Office.

JOHN GLOECKNER, OF PITTSBURG, PENNSYLVANIA.

DINNER-PAIL.

SPECIFICATION forming part of Letters Patent No. 368,469, dated August 16, 1887.

Application filed December 27, 1886. Serial No. 222,627. (No model.)

*To all whom it may concern:*

Be it known that I, JOHN GLOECKNER, a citizen of the United States, residing at Pittsburg, in the county of Allegheny and State of Pennsylvania, have invented certain new and useful Improvements in Dinner-Pails; and I do hereby declare the following to be a full, clear, and exact description of the invention, such as will enable others skilled in the art to which it appertains to make and use the same.

My invention relates to an improvement in dinner-pails; and it consists in the combination of the pail which is formed of a suitable number of sections, each one of which is provided with perforated loops, through which the bars connected with the handle are passed, and in which the springs connected to a handle can be made to catch, whereby the sections may be used either together or separately, as will be more fully described hereinafter.

The object of my invention is to provide an ordinary pail which is composed of a number of detachable sections, each one of which is provided with a perforated loop upon its opposite ends, through which bars connected to the handle can be made to pass for the purpose of connecting all of the sections together, and in which springs connected to a handle can be made to engage, whereby each section can be used separately as a bucket when detached from the others.

The accompanying drawings represent my invention.

Figure 1 represents a side elevation of a dinner-bucket complete. Fig. 2 is an end view of the same, partly in section. Fig. 3 is a perspective of the handle and spring complete. Fig. 4 is an end view of one of the sections detached and a different form of handle used in connection therewith.

The dinner pail or bucket is composed of three compartments, of which A represents the part usually adapted to hold the liquid portion of a workman's dinner, such as coffee, tea, or soup. The bottom of this compartment extends beyond its perpendicular sides in the form of a flange, $a$. The upper compartment, B, is partly let into the former and covered by a lid. On the third compartment, E, which contains the lamp L, rests the flange $a$ around the bottom of compartment A, and is held in place by two removable bars, $b$, attached to the ends of the bail D, which bars are pushed down into loops $c$ at opposite sides of each of the compartments A and E, and therein held by springs $d$, that enter into notches $e$ on the edges of the bars $b$. The loops $c$, when the part A is placed on the lower compartment, E, are the one over the other to allow the bars $b$, by which these parts of the pail are firmly held together, to enter. To separate the parts A and E, the bars $b$ on the bail have first to be drawn out, after pushing back the springs $d$ to release them. The lamp L is introduced through the bottom of part E, and held in any suitable manner to be readily removed and replaced. Air-holes are in the walls of the chamber E, for the passage of air to and from the flame of the lamp. Under the bottom of the part E are feet $f$, to keep the lamp from becoming injured when the pail is placed on the ground.

When the dinner-pail is to be used for other purposes than holding the dinner, the three parts A, B, and E can be separated, the lid placed on part A, and another bail, G, with a wire spring, S, at each of its ends, be applied by sliding the points of the springs into the loops $c$ to be caught in the holes $g$.

I claim—

A dinner bucket or pail formed of a number of detachable sections, each one of which is provided with a perforated loop, $c$, upon each of its ends, the handle G, and the springs S, which are made to engage with the loops, whereby each section can be used separately as a bucket when detached from the other parts, substantially as shown and described.

In testimony whereof I affix my signature in presence of two witnesses.

JOHN GLOECKNER.

Witnesses:
 LOUIS MOESER,
 HERMAN FELIX.